UNITED STATES PATENT OFFICE.

LOUIS WEISBERG AND RALPH S. POTTER, OF GRANTWOOD, NEW JERSEY, ASSIGNORS TO THE BARRETT COMPANY, A CORPORATION OF NEW JERSEY.

POLYGLYCEROL RESIN.

1,424,137. Specification of Letters Patent. Patented July 25, 1922.

No Drawing. Application filed February 19, 1921. Serial No. 446,509.

*To all whom it may concern:*

Be it known that we, LOUIS WEISBERG and RALPH S. POTTER, citizens of the United States, residing at Grantwood, in the county of Bergen and State of New Jersey, have invented certain new and useful Improvements in Polyglycerol Resins, of which the following is a specification.

This invention relates to new and useful improvements in synthetic resinous products and in processes for making the same. It has been known for sometime that resinous bodies could be formed by heating together a polyhydric alcohol, a polybasic acid of the aromatic series, and a dibasic acid of the aliphatic series. Most of these resins contain glycerol and phthalic anhydride and one other acid such as succinic, malic, tartaric, maleic, or fumaric acid. According to the amount of the aliphatic acid used, products of widely different physical properties are obtained. Thus, without any aliphatic acid at all, the product is extremely brittle, while if the proportion of aliphatic acid is sufficiently increased, a tough, elastic body is produced. By proper treatment these resins may be rendered substantially inert to water and many ordinary chemicals, thus making them useful in a variety of applications where resistance to water is required.

Three classes of resins may be distinguished, namely:

*Class A.*—Initial condensation product; soluble in acetone; fusible melting point seldom exceeds 120° C. (temperatures throughout this specification are on the centigrade scale); not resistant to cold water; passes on further heating into a resin of class B.

*Class B.*—Intermediate condensation product; insoluble in acetone; infusible; can be molded under heat and pressure; not resistant to cold water; passes on suitable heat treatment into a resin of class C.

*Class C.*—Final condensation product; insoluble in acetone; infusible; can be molded under heat and pressure; resistant to both hot and cold water.

These different products may be made from the same starting materials by suitably modifying the temperature and duration of heating. The initial condensation product is an A-resin, the intermediate product a B-resin, and the final condensation product a C-resin. The greater the extent to which the heat treatment is carried, the more inert is the product.

An obstacle of considerable magnitude in the manufacture of these resins is the length of time required to complete the process. This time is particularly long in that process of manufacture, wherein the production of a bubble-free product depends on carrying out the reaction at a temperature below the melting point of the resin. At such temperature the reaction proceeds so slowly that the time required to produce the finished product constitutes a serious obstacle. By the present invention a marked saving in time (hence, in expense of manufacture) is effected.

This saving of time is especially important in the production of molded articles when, as is often desired, the final heat treatment is carried out within the mold itself. Each mold is thereby enabled to turn out a greater number of pieces in a working day or in a given time, and since such molds are often expensive, the cost of each piece is correspondingly lowered.

It is well known that polyhydric alcohols are generally capable of being condensed with themselves to form more complex bodies. This condensation is generally regarded as taking place with elimination of water. The exact chemical constitution of the substances so formed is still somewhat in doubt, but they undoubtedly retain some of their alcoholic character since they combine with acids. Indeed, we have found that such bodies react far more quickly with certain acids than do the polyhydric alcohols from which they are derived, and we have applied this discovery to the improvement of prior processes for making resins from polyhydric alcohols.

For example, when glycerol (which is a polyhydric alcohol) is distilled, the residue in the still consists largely of a mixture of substances called "polyglycerols." These are mainly di- and triglycerols, and are said to be formed by elimination of water between two or more molecules of glycerol. There are a number of methods by which a better yield of polyglycerols may be obtained; for example, by the addition of about one-half per cent of sodium hydroxide or of sodium acetate and heating for a half hour near 280° C., the greater part of the glycerol may be converted to a mixture of di- and triglycerols. This mixture is a liquid which is more viscous than glycerol itself, and from which the various constituents can be separated by distillation under diminished pressure. This separation, however, is not necessary, as the unseparated mixture serves very well as a starting point for making resins.

It is to be understood that any suitable method for making these polyglycerols may be employed; for the present invention relates to the utilization of polyglycerols, of whatever origin or however made or produced, in the manufacture of resins and not to the manufacture of the polyglycerols themselves. It is to be understood also that other condensed polyhydric alcohols, as well as the polyglycerols, may be employed, as for example, the polyglycols.

To make resins from "polyglycerols," the procedure is similar to that when glycerol itself is used, except that certain precautions must be observed on account of the greater speed with which the reaction takes place, especially in making the class A-resin. At 170° C. for instance, the polyglycerols produce class A-resin more than five times as rapidly as glycerol. It is important at the start to raise the temperature slowly until the acids are completely dissolved. Otherwise the reaction may proceed too quickly to a point where the resin is no longer fusible, and some of the acid may be left undissolved. The rate at which the temperature may be raised depends primarily on the acids used. Phthalic anhydride, maleic acid, and malic acid dissolve much more readily, for example, than does fumaric acid.

In practicing this invention the polyglycerols may be heated with a dibasic aromatic acid. A polybasic aliphatic acid may be substituted wholly or in part for the aromatic acid, and as soon as the mixture becomes homogeneous, the temperature may be raised more rapidly. The color of the mixture is dependent upon the purity of the constituents. The mixture is of a clear yellow color if the constituents are sufficiently pure. At first the mixture is soft and sticky, but as the heating continues, the melting point rises, and the stickiness eventually disappears. If the heating is interrupted when this stage is reached, the product has the properties of a resin of class A.

The A-resin, on further heating, passes into a resin of class B. When this heating is carried out at a temperature below the melting point of the A-resin, a homogeneous bubble-free product is obtained in approximately one-half the time required when glycerol is used. At higher temperatures the reaction becomes violent, heat is evolved, and the product becomes filled with bubbles and is frothy. This frothy product may be ground and molded under pressure. This removes the bubbles; so in the end a good B-stage product may be obtained by either method of heating.

After the B-stage is reached, the resin may be heated to a higher temperature without danger of frothing, provided that the temperature is not raised too suddenly. The larger the mass of material being handled, the greater is the care required in this regard. When the B-resin is heated at a temperature of 170° or higher, a further transformation takes place. This results in the production of the C-resin. This reaction is usually carried out at the highest practicable temperature in order to save time. The temperature is nearly always as high as 200° and may even reach 250°. The reaction may be completed in a shorter time with the polyglycerol resins than with the ordinary glycerol resins. It has been found in many cases that not more than half the time is required. It is frequently desirable to carry out this finishing heat treatment within the mold, and wherever this is the case the polyglycerol resins are, therefore, to be preferred to the glycerol resins.

The physical properties of the so obtained polyglycerol resins do not differ greatly from the corresponding glycerol resins. Accordingly, they can be employed generally in place of the glycerol resins and with equally satisfactory results. In one case, however, there is a notable improvement. Resins made from glycerol and phthalic anhydride are so brittle and sensitive to shock that for many technical purposes it has been necessary to replace part of the phthalic anhydride by certain polybasic aliphatic acids, which are at present more expensive than phthalic anhydride, such as succinic, malic, tartaric, maleic, fumaric, citric, or malo-malic acid, thus producing tougher and more elastic resins. To a considerable degree, the same effect may be obtained simply by the use of polyglycerols with phthalic anhydride in place of glycerol. Thus the work required to break a polyglycerol-phthalic anhydride test specimen is approximately twice that required for a similar glycerol-phthalic anhydride resin (measured on a ball impact machine). The main improvement by the polyglycerol process, however, is the saving in time and expense of manufacture; the point just mentioned is, however, of considerable importance and is a further advantage which may be obtained by the practice of this invention.

The advantage of the polyglycerol process extends through all stages of the condensation and so applies to the manufacture of all the classes of resins enumerated. Among the acids which may be employed in this process are phthalic acid or phthalic anhydride. Either the acids themselves or the anhydrides of other polynuclear aromatic acids, such as diphenic acid, 1.8 naphthalic acid, benzoyl-benzoic acid, chlor-benzoyl-benzoic acid, and methyl-benzoyl-benzoic acid, may be substituted in part or wholly for phthalic acid or anhydride with good results. Also, polybasic aliphatic acids, such as succinic, malic, tartaric, maleic, fumaric, citric, or malo-malic acids may be used. Mixtures of these acids may also be employed to produce the resins, but it is preferable to have always present at least a small percentage of an aromatic acid for the best results. The term polyglycerol is used in the claims in a broad sense and is meant to include the polyglycols and similar condensed polyhydric alcohols.

These resins, on heating with a twenty percent solution of caustic soda, produce a result from which a polyhydric alcohol and the acid or acids employed, or the transformation product of the acid or acids employed may be recovered by means well understood by chemists. For example, maleic acid may be recovered entirely or in part as fumaric acid. More specifically, a specimen may be boiled with about ten times its bulk of a twenty percent solution of caustic soda filtered, cooled and acidified with hydrochloric acid. From the product of these operations the alcohol and the acid or acids employed in making the resin may be recovered.

The polyglycerol resins may be mixed with shellac as disclosed in U. S. Patent No. 1,413,144, and the mixtures used as a varnish or molding composition to replace shellac. They may also be used for such purposes as storage battery tanks, phonograph records, molded insulation, and molded articles generally, due regard in each case being paid to the choice of resin according to the requirements for the purpose intended.

We claim:

1. The process which comprises heating a polyglycerol and a polybasic acid of the aromatic series until a water-resistant product results.

2. The process which comprises heating a polyglycerol, a polybasic acid of the aromatic series and a polybasic acid of the aliphatic series until a water-resistant product results.

3. The process which comprises heating a polyglycerol, and a dibasic acid of the aromatic series and a polybasic acid of the aliphatic series until a water-resistant product results.

4. The process which comprises heating a polyglycerol and a polybasic acid of the aromatic series until an infusible and a water-resistant product results.

5. The process which comprises heating a polyglycerol, a polybasic acid of the aromatic series and maleic acid until a water-resistant product results.

6. A water-resistant resin which, when boiled with a twenty percent solution of caustic soda, gives a solution from which can be obtained a polyhydric alcohol, a polybasic aromatic acid, and maleic acid.

In testimony whereof we affix our signatures.

LOUIS WEISBERG.
RALPH S. POTTER.